United States Patent [19]

Rasmussen et al.

[11] Patent Number: 4,605,839
[45] Date of Patent: Aug. 12, 1986

[54] DUAL PARISON HEATING REFLECTOR AND METHOD

[75] Inventors: David E. Rasmussen, Thornton; Bruce A. Moen, Golden, both of Colo.

[73] Assignee: Adolph Coors Company, Golden, Colo.

[21] Appl. No.: 684,669

[22] Filed: Dec. 21, 1984

[51] Int. Cl.$^4$ ............................................. H05B 3/40
[52] U.S. Cl. ..................................... 219/349; 219/347
[58] Field of Search .......... 219/349, 347, 342, 85 BA, 219/85 BM

[56] References Cited

U.S. PATENT DOCUMENTS

| | | | |
|---|---|---|---|
| 2,257,366 | 9/1941 | Bates | 219/349 |
| 2,325,050 | 7/1943 | Goodwin | 219/349 |
| 2,785,623 | 3/1957 | Graham | 219/349 |
| 3,121,153 | 2/1964 | Hart | 219/349 |
| 3,179,898 | 4/1965 | Meltzer | 219/349 |
| 3,427,433 | 2/1969 | Foreman | 219/349 |
| 3,975,618 | 8/1976 | Goos | 219/349 |
| 4,052,593 | 10/1977 | Ebert | 219/349 |
| 4,058,699 | 11/1977 | van Vloten | 219/349 |
| 4,170,932 | 10/1979 | Lalancette | 219/349 |

Primary Examiner—Clarence L. Albritton
Assistant Examiner—Teresa J. Walberg
Attorney, Agent, or Firm—Klaas & Law

[57] ABSTRACT

A device for heating a plurality of radiant absorbers which utilizes a source of radiant energy in conjunction with a plurality of curved reflective surfaces. The reflective surfaces function to provide a device which directs essentially all of the radiation emitted by the radiant source onto the radiant absorbers. High efficiency is obtained as well as the ability to heat more than one radiant absorber simultaneously. Reflective surfaces can comprise, in general, curved surfaces, multiradius surfaces, or portions of ellipses.

8 Claims, 5 Drawing Figures

DUAL PARISON HEATING REFLECTOR AND METHOD

BACKGROUND OF THE INVENTION

The present invention pertains generally to heaters and more particularly to radiant heaters.

Generally, three methods exist for heating articles in an industrial process, i.e., convection, conduction, and radiant heating. A major disadvantage of conduction heating is that it requires heater contact with the article, which can result in a slow and non-uniform heating process. Also, overall operating efficiency is low, in many cases, depending upon the efficiency of conduction to the particular material to be heated.

Convection heating, such as used in convection ovens, provides good uniform heating throughout the article and utilizes relatively inexpensive fossil fuels. However, as in conduction heating, the overall operating efficiency is low due to poor coupling of heat to the article. Efficiency is also reduced by the losses inherent in fuel combustion and the necessity to ventilate the convection oven to remove by-products produced during heating. Ventilation of convection ovens requires removal of the gaseous heating medium, which further reduces efficiency. Moreover, convection ovens are normally employed as batch type heaters which require extra handling in both automated and manual processes. Also, convection ovens require a substantial preheating time to obtain a suitable operating temperature, resulting in the necessity to maintain operating temperatures in the oven during short periods of non-use when it would be impractical to turn the oven off because of excessive delays. This, again, reduces overall efficiency.

To overcome these disadvantages and limitations, radiant heaters have been utilized in industry which employ nichrome and tungsten filaments in quartz tubes. Both aluminum and gold reflectors are used in conjunction with these sources to increase efficiency. Although radiant heaters are more expensive to operate than other types of heaters during actual operating time, a number of factors result in actual lower overall operating cost when radiant heaters are implemented in an industrial process. For example, since the energy coupling medium utilized is primarily infrared radiation, ventilation to remove by-products produced during the heating process does not result in removal of the heating medium, such as in convection ovens. Similarly, the energy from radiant heaters can be coupled very efficiently to radiant absorbers. The process of coupling energy to the radiant absorber can be controlled with high accuracy such that only the required energy to heat the article is used so as to further increase efficiency.

Radiant heaters also have the advantage of being adaptable to automated systems due to the small size of radiant heaters which allows easy incorporation into a production line process. Additionally, radiant sources are capable of reaching full operating power within seconds, allowing them to be turned off when production stops or between heating cycles in the automated process. Also, since a radiant source is capable of coupling large amounts of heat into an article in seconds, it can be incorporated in a high speed automated process without limiting production. Moreover, radiant heaters are capable of providing both uniform heating as well as localized heating. The source of power for the radiant source is electricity which is a clean and safe source of power having a high conversion efficiency, i.e., near 90%, to ir radiation.

Typical prior art radiant heaters utilize curved reflectors, such as parabolic reflectors, with the radiant source located at the focal point of the parabola. Although this increases the amount of radiation which impinges on the article, a large portion of the reflected radiation can be blocked by the radiant source, such as illustrated by radiation 11 of FIG. 1. Additionally, in many reflector designs a large portion of radiation emitted by the source does not impinge directly upon the article to be heated and also is not reflected by the parabolic reflector to impinge upon the article to be heated, such as illustrated by radiation 13 of FIG. 1. Consequently, a large portion of the energy emitted by a radiant source in typical radiant heater designs is unusable. Furthermore, it is occasionally useful to refract light through an article to be heated to increase the amount of absorbed energy.

Consequently, it would be desirable to provide a radiant heater which is capable of directing a large portion of the energy emitted by a radiant source onto one or more articles to be heated to increase efficiency of the system.

OBJECTS OF THE INVENTION

It is therefore an object of the present invention to provide an improved radiant heating system.

It is also an object of the present invention to provide an improved radiant heating system which is efficient in operation.

Another object of the present invention is to provide a radiant heating system which is capable of heating curved radiant absorbers.

Another object of the present invention is to provide a device for heating a plurality of radiant absorbers.

Another object of the present invention is to provide a device for heating a plurality of radiant absorbers with high efficiency.

Additional objects, advantages and novel features of the invention are set forth in part in the description which follows and will be understood by those skilled in the art upon examination of this application or may be learned by practice of the invention. The objects and advantages of the invention may be realized and obtained by means of the instrumentalities and combinations particularly pointed out in the appended claims.

SUMMARY OF THE INVENTION

To achieve the foregoing and other objects and in accordance with the purposes of the present invention, as embodied and broadly described herein, the apparatus of this invention may comprise a device for heating a plurality of radiant absorbers comprising a source of radiant energy for heating the radiant absorbers with direct radiation which impinges directly upon the radiant absorbers and indirect radiation which does not impinge directly upon the radiant heat absorbers; reflector means for reflecting the indirect radiation a single time to impinge upon the radiant absorbers whereby the reflector means is aligned with the source such that none of the indirect radiation is blocked by the source.

The present invention may also comprise a device for heating a plurality of radiant absorbers comprising a source of radiant energy for heating the radiant absorbers with direct radiation which impinges directly upon the radiant absorbers and reflected radiation which is reflected a single time to impinge upon the radiant absorbers; reflector means for directing the reflected radiation to impinge upon the radiant absorbers and aligned with the source such that none of the reflected radiation is blocked by the source.

The present invention may also comprise a device for heating a plurality of radiant absorbers with high efficiency comprising a source of radiant energy; first reflector means for reflecting radiation which does not impinge directly upon a first radiant absorber, the first reflector means having curved surfaces capable of directing radiation by a single reflection to impinge upon the first radiant absorber; at least one additional reflector means for reflecting radiation which does not impinge directly upon an additional radiant absorber, the additional reflector means having curved surfaces capable of directing radiation by a single reflection to impinge upon the additional radiant absorber and aligned with the first reflector means such that none of the reflected radiation is blocked by the source.

The present invention may also comprise a device for heating a plurality of radiant absorbers comprising a source of radiant energy; first multiradius reflector means disposed between the source and a first radiant absorber having an opening sufficiently small such that the first multiradius reflector means reflects essentially all the radiant energy emitted by the source in a direction defined by the source and the first radiant absorber which does not impinge directly upon the first radiant absorber, the multiradius reflector means having a plurality of interlocking radii of curvature to provide a continuous curved surface which is aligned to direct the radiant energy with a single reflection to impinge upon the first radiant absorber; at least one additional multiradius reflector means disposed between the source and an additional radiant absorber having an opening sufficiently small such that the additional multiradius reflector means reflects essentially all the radiant energy emitted by the source in a direction defined by the source and the additional multiradius reflector means which does not impinge directly upon the additional radiant absorber, the additional multiradius reflector having a plurality of interlocking radii of curvature to provide a continuous curved surface which is aligned to direct the radiant energy with a single reflection to impinge upon the additional radiant absorber; whereby the first multiradius reflector means and the additional multiradius reflector means are aligned with the source such that reflected radiation is not blocked by the source.

The present invention may also comprise a device for heating a plurality of radiant absorbers comprising: a plurality of reflectors having reflective surfaces comprising portions of ellipses joined together such that ellipses defined by the portions have at least one common focal point, the reflective surfaces aligned to reflect radiant energy, which does not impinge directly upon the radiant absorber, to impinge upon the radiant absorbers with a single reflection; a source of radiant energy disposed along the common focal point such that none of the radiant energy is blocked by the source.

The present invention may also comprise a reflector assembly for directing radiant energy from a radiant source onto plastic parisons comprising: first reflector means having curved reflector portions; second reflector means having curved reflector portions which are substantially similar to the curved reflector portions of the first reflector means; connecting means for aligning the first and second reflector means to form reflector cavities between the curved reflector portions of the first and second reflector means which are capable of directing substantially all radiant energy produced by the radiant source in an azimuthal plane to impinge upon sidewall portions of the plastic parisons.

The present invention may also comprise a plastic container manufacturing process comprising the steps of: forming plastic parisons; preheating the plastic parisons in a preheating oven; radiantly heating the plastic parisons to a temperature suitable for blow molding with direct radiation which impinges directly upon the plastic parisons and reflected radiation which is reflected a single time to impinge upon the plastic parisons; rotating the plastic parisons during radiant heating to achieve uniform heating; blow molding the plastic parisons while the plastic parisons are at a temperature suitable for blow molding.

The advantages of the present invention are that it provides a radiant heating system which couples essentially all of the radiation from the radiant source to impinge upon a curved radiant absorber, such as a plastic parison, such that maximum absorption of the radiation can occur in the curved radiant absorber. The radiant source is disposed between two or more reflector systems at a point where the systems are joined together so that none of the radiation is blocked by the source and the source is capable of heating a plurality of radiant absorbers, simultaneously. Moreover, the reflective surfaces direct the radiant energy onto the radiant absorbers with a single reflection to reduce the energy loss to the reflective surface.

BRIEF DESCRIPTION OF THE DRAWINGS

An illustrative and presently preferred embodiment of the invention is shown in the accompanying drawings wherein.

DETAILED DESCRIPTION OF THE INVENTION

Figure 2:
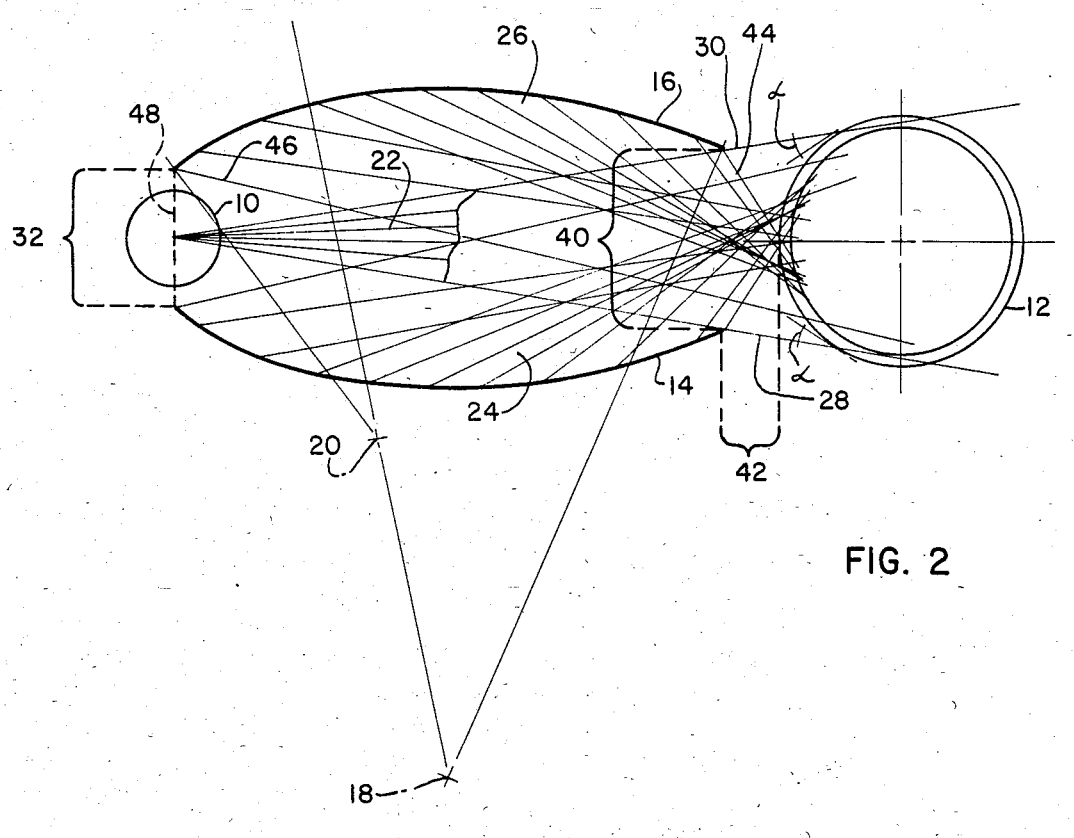
FIG. 2 is a schematic diagram of the curved reflectors utilized in accordance with the present invention.

Referring to FIG. 2, generally the present invention comprises a source of radiant energy 10 which produces radiant energy in the ir spectral region to heat a radiant absorber 12. Radiant source 10 can comprise a conventional cylindrical quartz lamp using either tungsten or nichrome as a filament or any linear radiating source desired. Radiant absorber 12 can comprise any article desired to be heated such as a cylindrically shaped plastic parison which must be heated to a predetermined temperature and according to a predetermined spatial gradiant prior to blow molding. The curved surface of radiant absorber 12 results in only a predetermined portion of the radiation emitted by source 10 impinging directly upon radiant absorber 12. It is desirable that radiant absorber 12 refract radiation from source 10 to increase the amount of energy absorbed. Radial projections 28 and 30 illustrate typical projections of radiation from source 10 which impinge upon radiant absorber 12 and are refracted into the radiant absorber medium. Consequently, direct radiation 22 falling within the boundaries of radial projections 28 and 30 is capable of directly heating the radiant absorber 12 and refract into the radiant absorber medium. Radiation falling outside of radial projections 28 and 30 must be redirected to impinge upon radiant absorber 12.

It would therefore be desirable to redirect any radiation falling outside of radial projections 28 and 30 to impinge upon radiant absorber 12. Reflectors 14 and 16 are provided which have a predetermined opening 40 which is sufficient to allow only direct radiation 22 to emerge from source 10 without being reflected by reflectors 14 and 16. Reflectors 14 and 16 are identical reflectors which have a curved surface comprising a multiradius surface or a portion of an ellipse, which is capable of reflecting all indirect radiation, i.e., all radiation which is not direct radiation 22 emitted from one half of source 10, to impinge upon radiant absorber 12.

Reflectors 14 and 16 can utilize compound curves such as the multiradius curves illustrated in FIG. 2, having a plurality of interlocking radii of curvature which form a continuous curved surface. As shown in FIG. 2, focal points 18 and 20 are aligned to provide the continuous curved surface. Focal point 18 can be determined by knowing the separation distance 42 required between reflectors 14, 16 and radiant absorber 12. Knowing distance 42, opening 40 can be determined using radial projections 28 and 30. Focal point 18 can be empirically determined by drawing a ray 44 from the intersection point of radial projection 30 with reflector 16 such that ray 44 impinges on radiant absorber 12. The total angle between radial projection 30 and ray 44 can then be bisected to determine the alignment of focal point 18. A similar process can be used to determine focal point 20 by bisecting the angle between ray 48, which is vertically disposed over the center point of source 10 and ray 46 and which impinges upon radiant absorber 12. Opening 32 must be made sufficiently large to accommodate radiant source 10.

The curved surface of reflectors 14, 16 can also comprise elliptical curves with a common focal point between adjacent reflector cavities. Radiation source 10 is disposed at the common focal point between the adjacent reflector cavities so that none of the radiant energy emitted by radiation source 10 is blocked by its structure.

Figure 3:
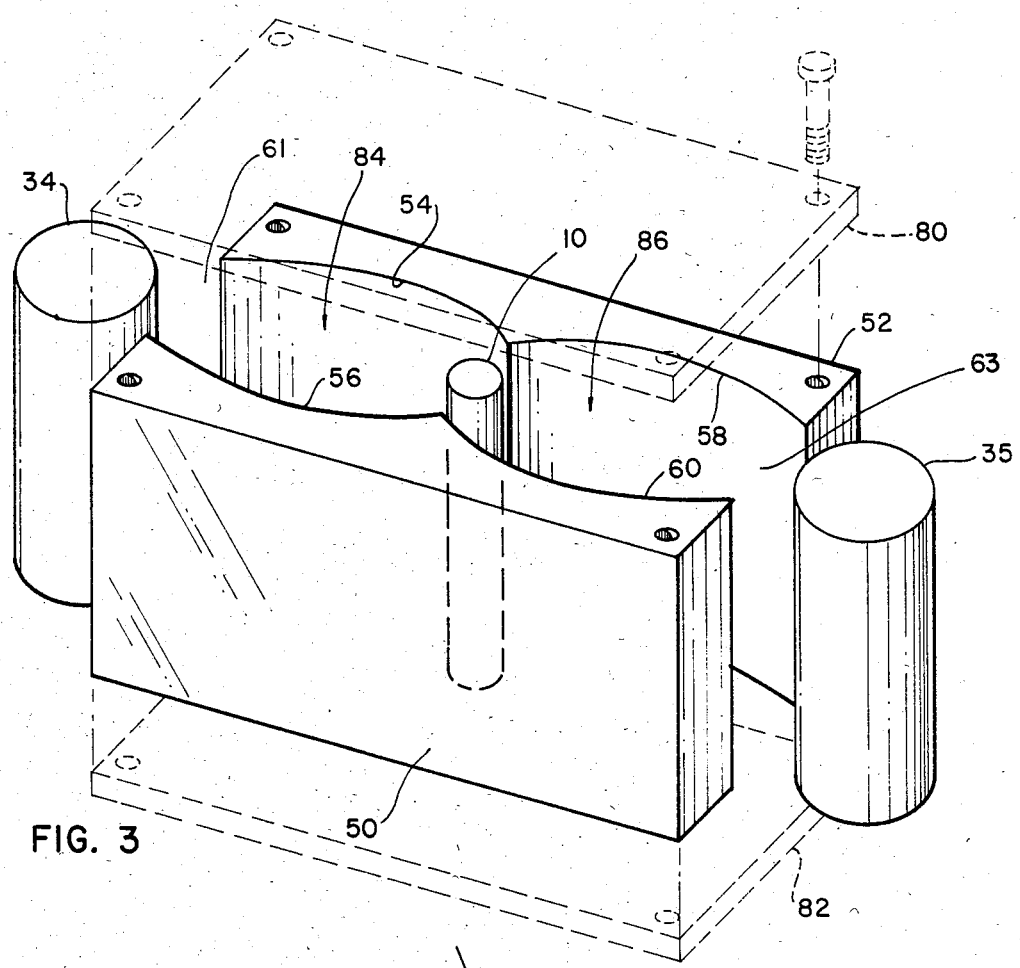
FIG. 3 is a schematic perspective view of an embodiment of the present invention.
Figure 1:
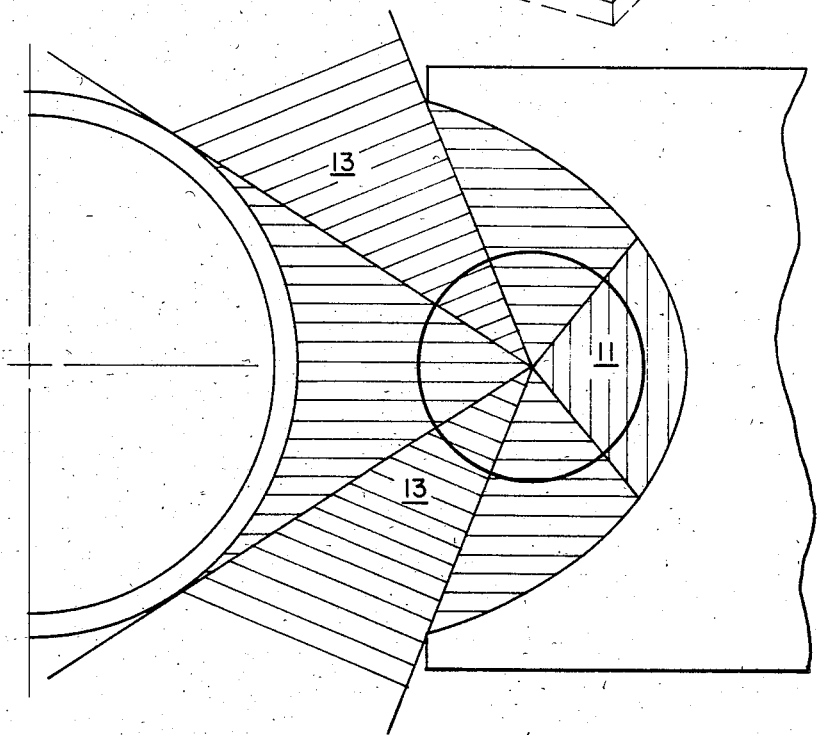
FIG. 1 is a schematic diagram of a typical prior art radiant heater illustrating unusable energy.

FIG. 3 is a schematic perspective view of an embodiment of the present invention. A radiant source 10 is disposed between a first and second reflector means comprising reflector halves 50 and 52 which have curved reflector portions comprising reflective surfaces 54, 56, 58, and 60, corresponding to reflective surfaces 14 and 16 illustrated in FIG. 2. Connecting means comprising end portions 80 and 82 align reflector halves 50 and 52 to form reflective cavities 84 and 86 between reflective surfaces 54 and 56, and reflective surfaces 58 and 60, respectively. Openings 61 and 63 cause both direct radiation emitted by source 10, i.e., radiation which is not reflected by reflective surfaces 54, 56, 58 and 60, and indirect radiation, i.e., radiation which is reflected by surfaces 54, 56, 58 and 60, to impinge upon radiant absorbers 34 and 35. By providing two sets of sub-radiant reflectors, essentially all of the radiation emitted by source 10 in an azimuthal plane between radiant source 10 and radiant absorbers 34, 35 impinges upon radiant absorbers 34, 35 so as to greatly increase efficiency of the system.

The azimuthal plane between radiation source 10 and radiant absorbers 34, 35 is defined as the continuous series of horizontal planes between source 10 and radiant absorbers 34, 35.

Figure 4:
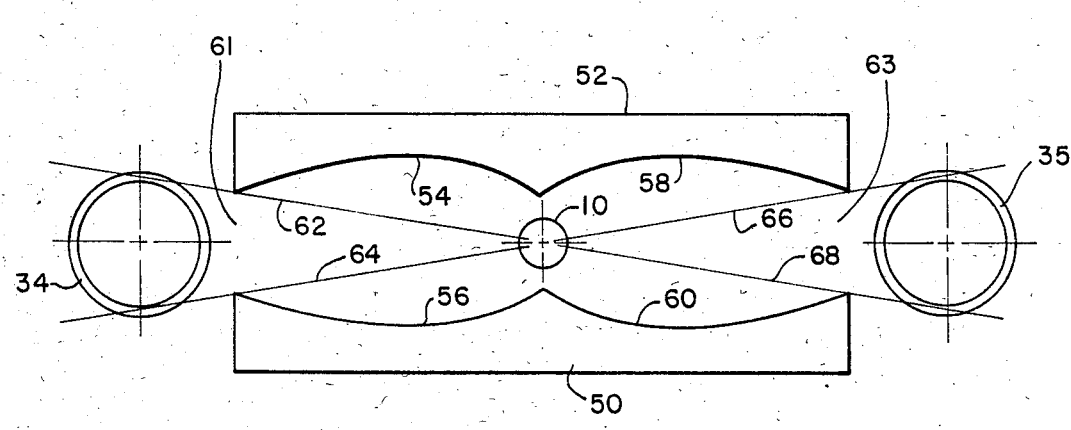
FIG. 4 is a schematic top view of the device illustrated in FIG. 3.

FIG. 4 is a schematic top view of the device illustrated in FIG. 3 showing radial projections 62, 64, 66, and 68, which correspond to the maximum angle at which direct radiation from source 10 will impinge upon radiant absorbers 34 and 35. As shown in FIG. 4, indirect radiation emitted by source 10 is reflected from reflective surfaces 54, 56, 58 and 60 which have a curvature, such as disclosed in FIG. 2, for example, which is capable of directing radiation using with single reflection onto radiant absorbers 34 and 35. Openings can be formed in reflector halves 50 and 52 to provide a channel for flowing air around source 10 for the purpose of cooling. Additionally, reflector halves 50 and 52 can have water cooling channels formed therein for the purpose of preventing overheating. Suitable means for imparting water flow and air flow can be coupled to the openings formed in reflector halves 50 and 52.

Figure 5:
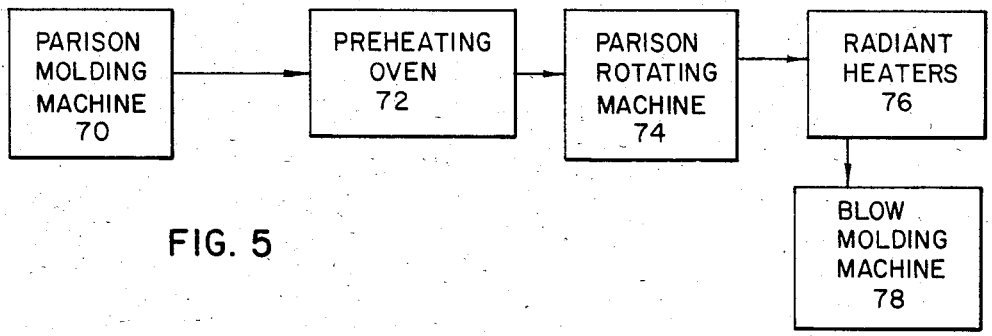
FIG. 5 is a schematic block diagram of the basic components of a plastic container manufacturing process.

FIG. 5 is a schematic block diagram of the basic components used in a plastic container manufacturing process. A parison molding machine 70 is used to produce plastic parisons or preforms which are later blow molded into a finished article. Typical plastic parison molding machines are disclosed in U.S. Pat. Nos. 3,307,726; 3,371,387; 3,389,434; 3,500,503 and 4,083,568, which are specifically incorporated herein by reference. In the non-integrated process of reheating and blow molding parisons to form plastic containers, the parisons are formed in a molding machine such as described above and stored for later processing.

After the parisons are formed in the parison molding machine 70 they are placed in preheating oven 72 prior to the blow molding process. Preheating oven 72 comprises a conventional convection type oven which is capable of uniformly heating a batch of parisons. Temperature of the parisons achieved in preheating oven 72 is less than that required for the blow molding process.

The preheated parisons are then transferred to a parison rotating machine 74 which rotates the parisons at a predetermined angular rotational speed to achieve uniform heating by radiant heaters 76. A parison rotating apparatus suitable for use in the present invention is disclosed in copending and commonly assigned U.S. patent application filed on even date herewith by Larry Mason Dugan, et al., entitled DEVICE AND METHOD FOR REHEATING AND BLOW MOLDING PARISONS, which is specifically incorporated herein by reference. Radiant heater 76 heat the parisons to a temperature suitable for blow molding in blow molding machine 78. U.S. Pat. Nos. 3,752,625 and 3,819,314 also disclose blow molding machines and are specifically incorporated herein by reference.

Consequently, the present invention provides a device for heating a plurality of radiant absorbers using a source of radiant energy disposed in a plurality of curved reflectors such that essentially all of the radiant energy emitted by the source impinges upon the radiant absorbers. Radiant energy reflected by the plurality of reflectors impinges upon the radiant absorbers in a substantially uniform distribution to provide substantially uniform heating. The present invention therefore provides a device which is highly efficient in operation and which is capable of heating a plurality of radiant absorbers, simultaneously.

The foregoing description of the invention has been presented for the purpose of illustration and description. It is not intended to be exhaustive or to limit the invention to the precise form disclosed, and other modifications and variations may be possible in light of the above teachings. The embodiment was chosen and described in order to best explain the principles and practical application of the invention to thereby enable others skilled in the art to best utilize the invention in various embodiments with various modifications as are suited to the particular use contemplated. It is intended that the appended claims be construed to include other alternative embodiments of the invention except insofar as limited by the prior art.

What is claimed is:

1. A device for heating a plurality of radiant absorbers comprising:
   a source of radiant energy for heating said radiant absorbers with direct radiation which impinges directly upon said radiant absorbers and indirect radiation which does not impinge directly upon said radiant absorbers;
   reflector means for reflecting said indirect radiation a single time to impinge upon said radiant absorbers whereby said reflector means is aligned with said source such that none of said indirect radiation is blocked by said source;
   said reflector means defining:
      a first elongate cavity means having an inwardly positioned end and an outwardly positioned end for directing radiant energy from said radiant energy source to a first radiant absorber located at a focus of said first cavity; and
      a second elongate cavity means having and inwardly positioned end and an outwardly positioned end for directing radiant energy from said radiant energy source to a second radiant absorber located at a focus of said second cavity;
   said first elongate cavity means and said second elongate cavity means each terminating at a common opening at said inwardly positioned ends thereof whereby said first cavity means and said second cavity means are positioned in contiguous relationship;
   said radiant energy source being positioned at said common opening;
   said outwardly positioned end of said first elongate cavity means terminating in a first outwardly positioned opening with said first radiant absorber being positioned outside of said first cavity means adjacent said first opening;
   said outwardly positioned end of said second elongate cavity means terminating in a second outwardly positioned opening with said second radiant absorber being positioned outside of said second cavity means adjacent said second opening.

2. The device of claim 1 wherein said radiant energy source comprises a generally cylindrical body and wherein said radiant absorbers comprise generally cylindrical bodies aligned in parallel relationship with said radiant energy source.

3. The invention of claim 2 wherein substantially all radiant energy from said source is radiated in a field defined by a continuous series of horizontal planes extending between said source and said absorbers.

4. The invention of claim 3 wherein said radiant absorbers comprise plastic parisons.

5. The invention of claim 4 wherein said parisons are mounted on a parison rotating apparatus for providing uniform heating.

6. The invention of claim 1 wherein said first cavity means and said second cavity means are positioned in substantially coaxial alignment.

7. The invention of claim 1 wherein said reflector means comprise elliptical surfaces.

8. The invention of claim 1 wherein said reflector means comprise polished metal surfaces each having a plurality of interlocking radii of curvature which form a continuous curved surface.

* * * * *